United States Patent [19]

Fischer

[11] 3,910,532
[45] Oct. 7, 1975

[54] INFLATABLE DEPLOYMENT SYSTEM AND METHOD

[75] Inventor: William H. Fischer, Belmar, N.J.

[73] Assignee: The Garrett Corporation, Los Angeles, Calif.

[22] Filed: Apr. 25, 1974

[21] Appl. No.: 464,022

[52] U.S. Cl............ 244/137 P; 182/48; 244/DIG. 2
[51] Int. Cl.² ......................................... B64D 25/14
[58] Field of Search ....... 244/137 R, 137 P, DIG. 2, 244/147, 149; 182/48; 193/25 B

[56] References Cited
UNITED STATES PATENTS

| | | | |
|---|---|---|---|
| 3,454,245 | 7/1969 | Burkdoll et al. | 244/DIG. 2 |
| 3,463,287 | 8/1969 | Smith | 244/DIG. 2 |
| 3,554,344 | 1/1971 | Summer | 244/DIG. 2 |
| 3,598,215 | 8/1971 | Summer | 244/DIG. 2 |
| 3,611,865 | 10/1971 | Schallert | 244/137 R |
| 3,633,853 | 1/1972 | Collins | 244/DIG. 2 |
| 3,771,749 | 11/1973 | Smialowicz | 244/DIG. 2 |
| 3,819,011 | 6/1974 | Kinase et al. | 182/48 |

Primary Examiner—Trygve M. Blix
Assistant Examiner—Galen Barefoot
Attorney, Agent, or Firm—Albert J. Miller

[57] ABSTRACT

An inflatable ejector bag or bladder is provided in the packboard of a folded inflatable escape slide. Inflation of the ejector bag will forcibly expel the inflatable escape slide from the packboard which is mounted on an aircraft door.

8 Claims, 7 Drawing Figures

INFLATABLE DEPLOYMENT SYSTEM AND METHOD

BACKGROUND OF THE INVENTION

Inflatable escape slides and/or slide rafts have been installed on substantially all passenger carrying aircraft to provide a rapid means for evacuating passengers in the event of an emergency. These inflatable escape devices are normally folded into a pack requiring a minimum of space in the interior of the aircraft and are either mounted on the interior of the aircraft door or immediately adjacent thereto. With the door closed a girt bar is connected to brackets on the floor inside the doorway such that in the event of an emergency it is only necessary to open the door to automatically deploy the slide. With the opening of the door, the girt bar will pull the slide from the door, thereby allowing the slide to fall through the doorway. Subsequently, the slide is rapidly inflated and is ready for evacuation of passengers within a very short period of time following opening of the door.

While in most aircraft the passenger doors are hinged at one side and swing outwardly and around as the door opens, some aircraft utilize other types of doors. For example, there are aircraft in which the door is opened by sliding it along tracks extending upwardly along the interior of the fuselage into the ceiling of the cabin. An example of an evacuation slide apparatus and method for automatically deploying such a slide from this type of door is disclosed in U.S. Pat. No. 3,771,749, assigned to the same assignee as this invention.

An even more stringent deployment situation is presented in aircraft having a plug type door, characterized by the fact that the plane of the door always remains generally parallel to the plane of the aircraft fuselage. In this type of system, the door initially moves straight outward from the aircraft's fuselage a prescribed distance and then moves laterally along the fuselage until the entire door opening is clear. Mounting the evacuation slide or slide raft in this type of door requires the slide or slide raft to be discharged from the door during the outward movement away from the fuselage and before any substantial lateral movement of the door. If the slide or slide raft is not fully discharged from the door before the lateral movement thereof, the slide will tend to become tangled and otherwise made inoperable since the slide girt bar is attached to the floor inside the doorway.

SUMMARY OF THE INVENTION

The present invention is directed toward a system and method for deploying inflatable escape apparatus from a plug type of door in an aircraft fuselage. It can, however, be used with other types of aircraft doors. Deployment of the inflatable slide is initiated by an inflatable ejector bag or bladder disposed in the slide packboard container mounted on the aircraft door.

DESCRIPTION OF THE PREFERRED EMBODIMENTS

Figure 1:
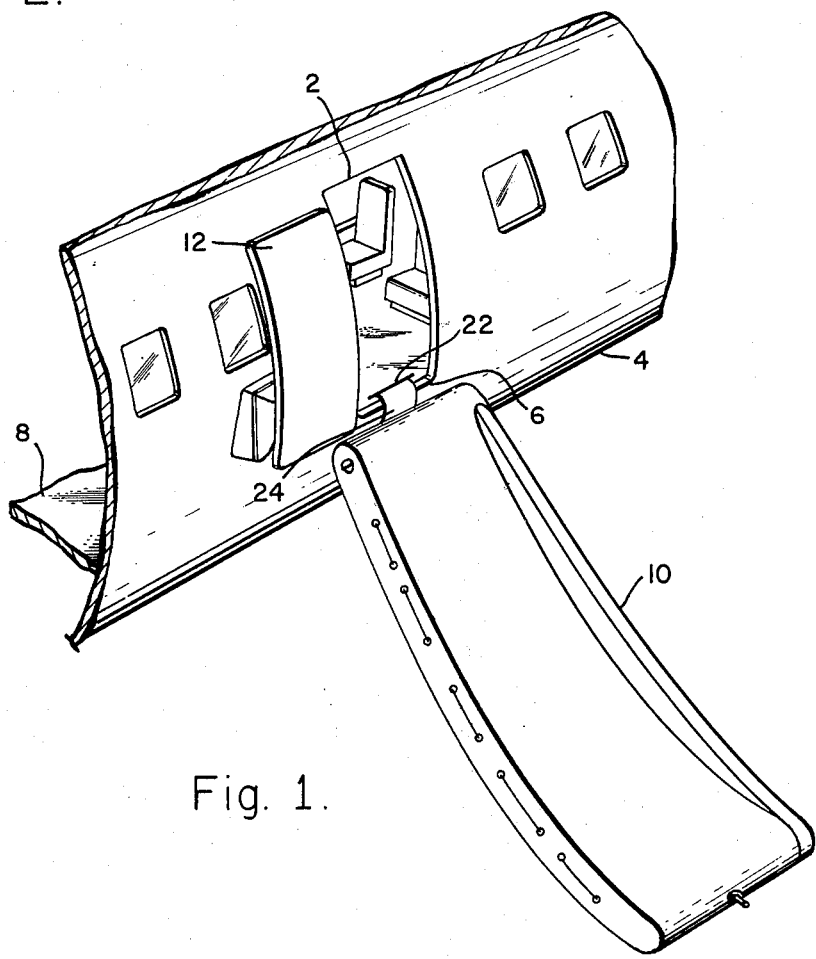
FIG. 1 is a perspective view, partially schematic, showing a portion of the aircraft fuselage adjacent the doorway and an inflatable escape slide deployed therefrom.
Figure 4:
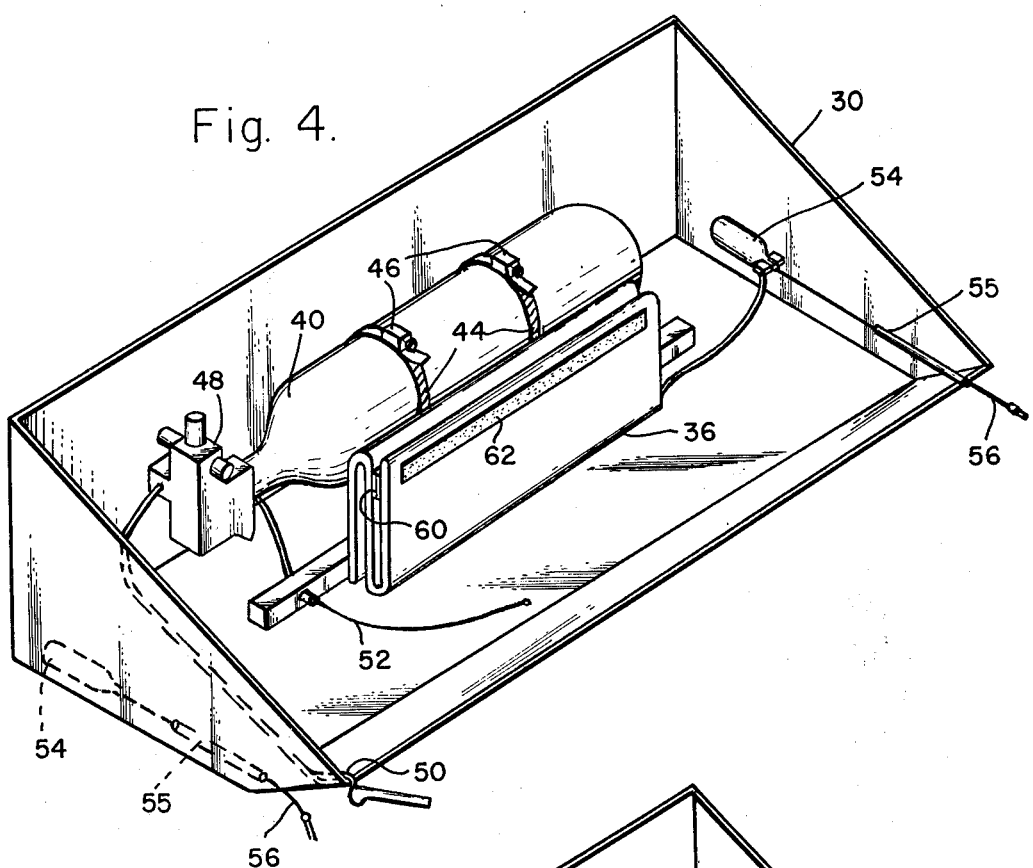
FIG. 4 is a perspective view showing the partially packed inflatable escape slide packboard for the inflatable escape slide.
Figure 7:
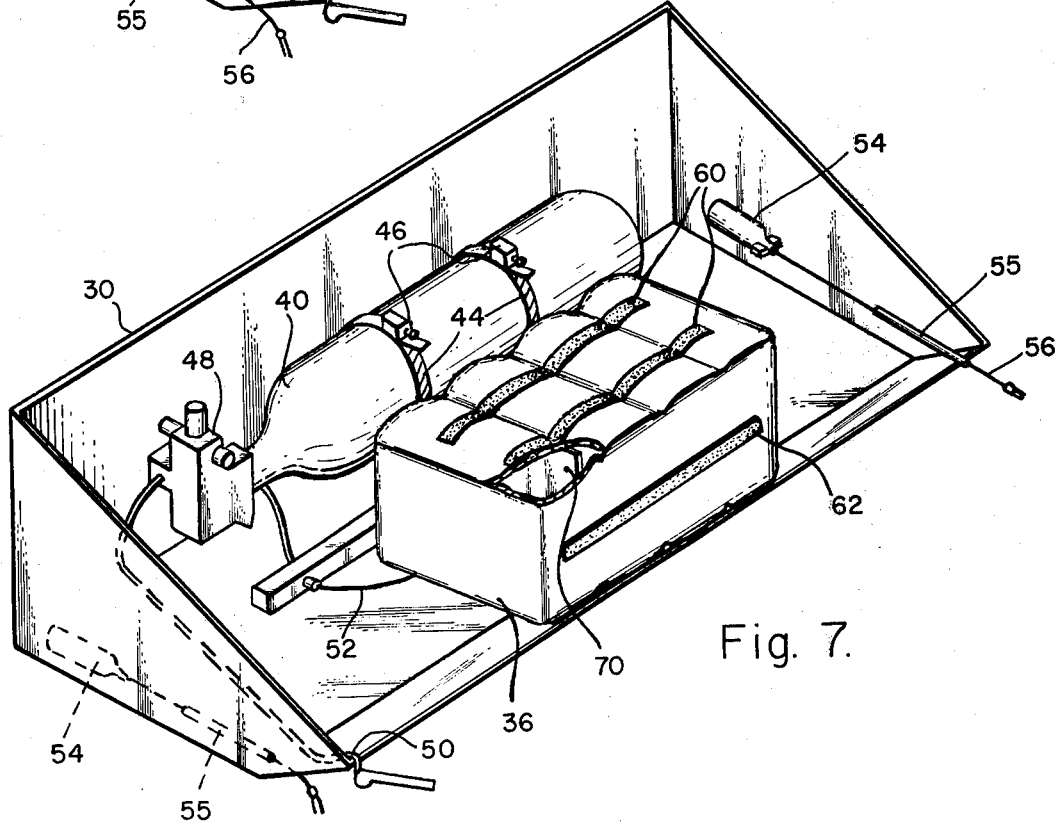
FIG. 7 is a perspective view showing the inflatable escape slide packboard with the inflated ejection bladder partially cut away.
Figure 5:
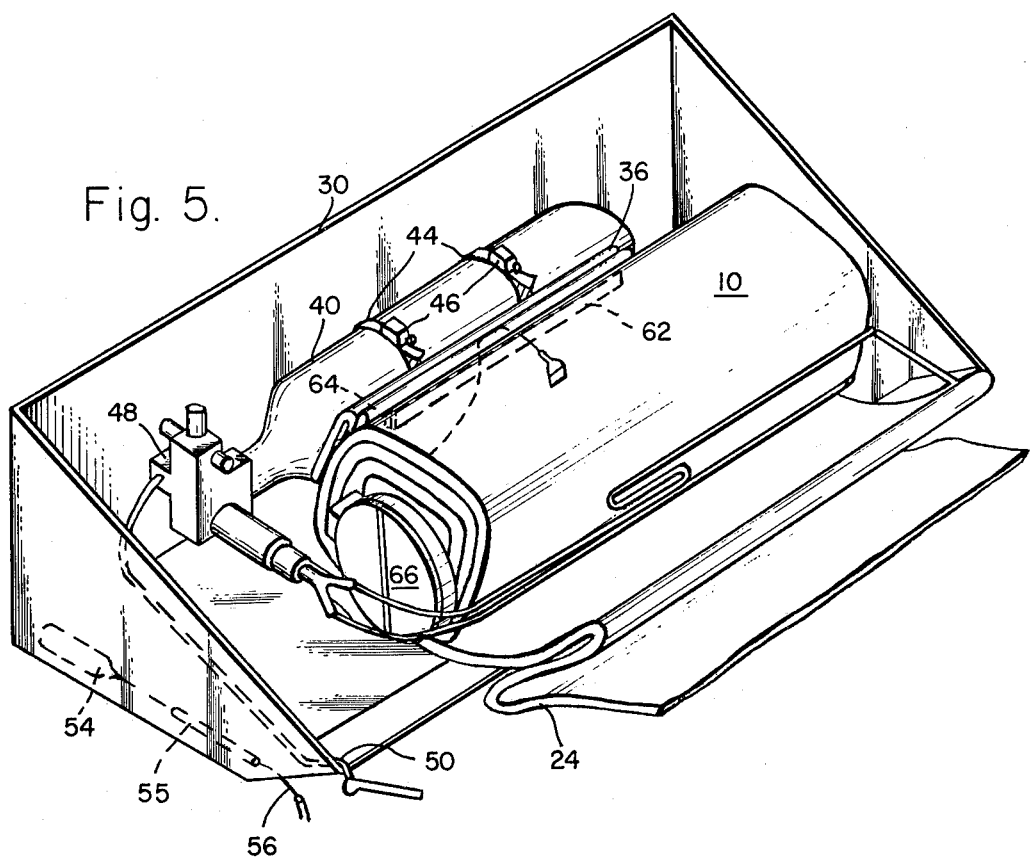
FIG. 5 is a perspective view showing the fully packed inflatable escape slide packboard.
Figure 6:
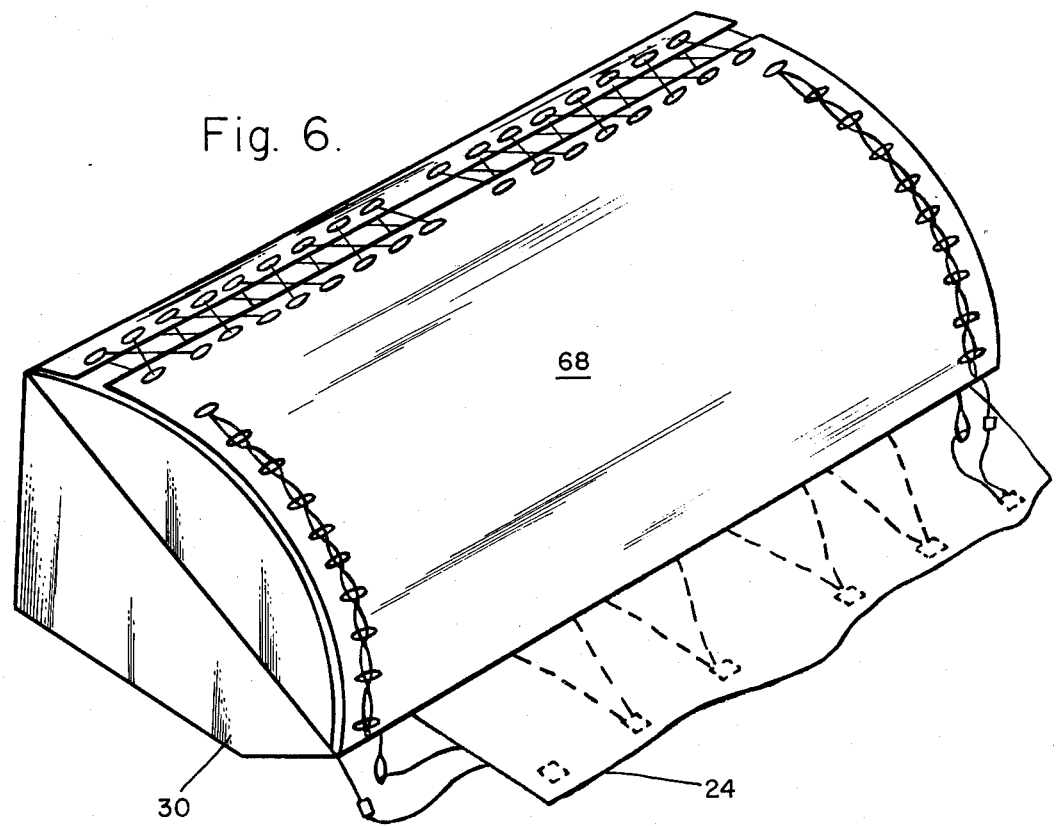
FIG. 6 is a perspective view showing the packboard with its soft cover.

In FIG. 1, the emergency inflatable evacuation system of the present invention is shown in association with a passenger doorway 2 in the fuselage 4 of an aircraft. The doorway 2 has a sill 6 which is approximately at the level of the floor 8 in the cabin of the aircraft fuselage 4. An inflatable evacuation slide 10 is secured at its upper end to the floor 8 of the aircraft in alignment with the doorway sill 6 while the lower end of the slide 10 rests on a lower surface such as the ground. The inflatable escape slide 10 is illustrated schematically in form and may comprise any of the commonly utilized evacuation slides and/or slide rafts generally described in U.S. Pat. Nos. 3,102,623, 3,595,357, 3,598,215, 3,692,144, 3,674,124 and 3,679,025.

The fuselage 4 is provided with a door 12 for closing the doorway 2. This plug type door 12 is shown in its fully open position in FIG. 1. The operation of a plug type door and the mechanisms involved therewith do not form a part of this invention as such mechanisms are commonly known in this art.

Figure 2:
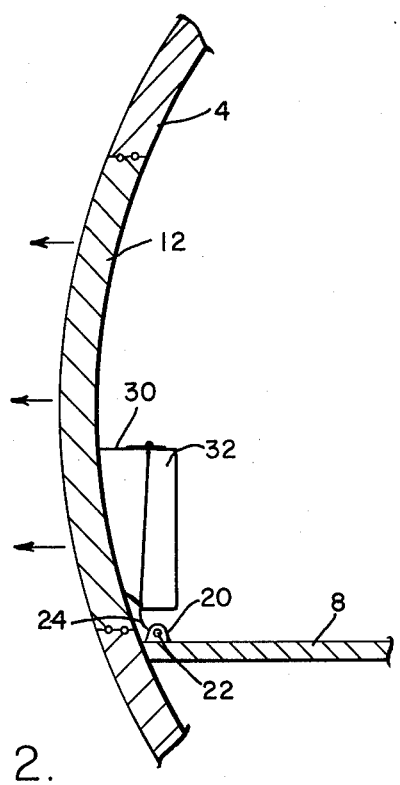
FIG. 2 is a cross-sectional view of the aircraft fuselage through the closed plug type door.

As illustrated in FIG. 2 the folded evacuation slide 10 is mounted on the interior of the plug type door 12. The evacuation slide 10 is folded into a packboard 30 having a hard cover 32. The girt 24 from the evacuation slide extends downward from the packboard 30 and includes a girt bar 22 affixed to brackets 20 on the floor 8 of the aircraft cabin.

Figure 3:
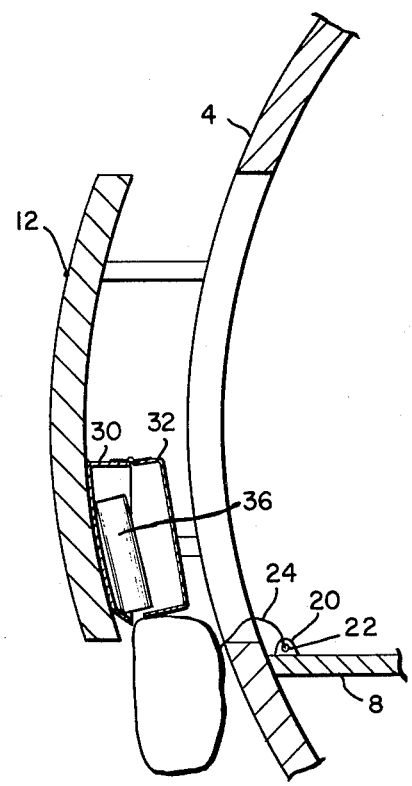
FIG. 3 is a cross-sectional view of the fuselage showing the plug type door partially open.

As the plug type door 12 is moved outward from the aircraft fuselage 4 to the position shown in FIG. 3, the hard cover 32 is partially opened and the folded slide 10 is discharged from the packboard 30 by means of the ejection bag 36.

The packboard 30 mounted upon the aircraft door 12 is more fully illustrated in FIGS. 4, 5, 6 and 7. This packboard 30 includes a cylinder 40 of compressed gas mounted at the base of the packboard 30 upon cradles (not shown). The cylinder 40 is held in these cradles by means of clamps 44 which are tightened by worm gear screws 46. A valve 48 actuated by either a manual release cable 50 or automatic release cable 52 controls the discharge of pressurized fluid from the cylinder 40. The ejection bladder 36 is mounted in a folded condition between the cylinder 40 and the folded slide 10. This ejection bladder 36 has at least one, and preferably two, separate inflator assemblies 54 having a release cable 56. A discharge cable guide 55 may be provided for the cable 56.

The ejector bag 36 is maintained in its folded condition by means of mating hook and pile fasteners 60. In addition, a pile fastener 62 is disposed on the outwardly projecting surface of the ejector bladder 36 for engagement with a hook fastener 64 on the slide 10.

The slide 10 having aspirator 66 would be folded into the packboard 30 with the girt 24 extending outward therefrom. The packboard 30 would then be covered with a soft cover 68 and then hard cover 32.

Immediately upon the opening of the plug type door 12, inflation of the ejector bag 36 will be automatically initiated. The ejector bag 36 will inflate with the lateral fabrication webs 70 restraining the bag in a generally rectangular form to push the folded slide out of the packboard 30 in a safe, non-pyrotechnic manner in a minimum of time before the plug type door 12 initiates any lateral movement. Once the slide 10 has been discharged from the packboard 30, it is secured solely by the girt bar 22 attached at the doorway sill 6 and inflation of the slide 10 can proceed in a normal conventional manner. The ejector bladder 36 requires only a small storage volume and minimum weight while providing a highly directional discharge force to the slide 10 without causing any damage thereto. It possesses high reliability and can be used repeatedly. It provides a low cost, easily installed method of insuring deployment of the slide package.

While specific embodiments of the invention have been illustrated and described, it is to be understood that these are provided by way of example only and that the invention is not to be construed as being limited thereto, but only by the proper scope of the following claims.

What I claim is:

1. Apparatus for evacuation from an elevated egress hatchway of an aircraft to a lower surface upon which the aircraft is disposed, comprising:
   a fluid distensible member, of a generally elongate configuration when fully inflated, disposed in an uninflated, folded configuration at the elevated egress hatchway with one end secured thereto;
   packboard means to enclose the uninflated, folded fluid distensible member, said packboard means mounted at the elevated egress hatchway;
   fluid distensible bladder means disposed in an uninflated, folded configuration in said packboard means to, when inflated, forcibly expel the uninflated folded fluid distensible member from said packboard; and
   means disposed in said packboard means to inflate said fluid distensible bladder means.

2. Apparatus for evacuation from an aircraft having a doorway and a door movable from a closed position in the doorway to an open position, said apparatus comprising:
   a fluid distensible member, of a generally elongate configuration when fully inflated, disposed in an uninflated, folded configuration at the aircraft doorway, said fluid distensible member having girt means for securing one end thereof to the aircraft adjacent the sill of said doorway;
   packboard means mounted upon said aircraft door to enclose said uninflated, folded fluid distensible member therein;
   a fluid distensible bladder disposed in said packboard means above said folded fluid distensible member;
   means to inflate said fluid distensible bladder in said packboard means to forcibly expel said uninflated, folded fluid distensible member from said packboard means; and
   means to inflate said fluid distensible member after said member has been forcibly expelled from said packboard means.

3. The apparatus of claim 2 in which said fluid distensible member is an inflatable evacuation slide.

4. The apparatus of claim 2 and in addition hook and pile fastener means to detachably secure said folded fluid distensible member to said folded fluid distensible bladder in said packboard means.

5. The apparatus of claim 2 wherein said fluid distensible bladder includes at least one lateral web extending in the direction of fluid distensible member ejection from said packboard means.

6. A method for deploying an inflatable evacuation slide from an aircraft doorway when said aircraft is disposed on a lower surface, the method of comprising:
   packing a folded inflatable ejection bladder and a folded inflatable evacuation slide in a packboard;
   mounting said packboard on the interior of the aircraft door;
   attaching one end of the folded inflatable evacuation slide adjacent the sill of the aircraft doorway;
   inflating the folded ejection bladder in said packboard to forcibly eject the folded evacuation slide from said packboard when the aircraft door is opened; and
   inflating the ejected evacuation slide to extend said slide to the lower surface upon which the aircraft is disposed.

7. Apparatus for evacuation from an aircraft having a doorway and a door movable from a closed position in the doorway to an open position, said apparatus comprising:
   a fluid distensible evacuation slide, of a generally elongate configuration when fully inflated, disposed in an uninflated, folded configuration at the aircraft doorway, said slide having girt means for securing one end thereof to the aircraft adjacent the sill of said doorway;
   packboard means mounted upon said aircraft door to enclose said uninflated, folded fluid distensible slide therein;
   a fluid distensible bladder disposed in an uninflated folded configuration in said packboard means above said folded fluid distensible slide, said bladder detachably secured to said slide in an uninflated folded configuration;
   first inflation means disposed in said packboard means to inflate said fluid distensible bladder to forcibly expel said uninflated, folded fluid distensible slide from said packboard means when said aircraft door is opened; and
   second inflation means disposed in said packboard means to inflate said fluid distensible slide after said member has been forcibly expelled from said packboard means.

8. The apparatus of claim 7 wherein said second inflation means comprises a compressed gas cylinder disposed in said packboard means above said fluid distensible bladder.

* * * * *